United States Patent
Aggarwal et al.

(10) Patent No.: US 6,505,207 B1
(45) Date of Patent: Jan. 7, 2003

(54) METHODS AND APPARATUS FOR PERFORMING DIMENSIONALITY REDUCTION IN A SUPERVISED APPLICATION DOMAIN

(75) Inventors: Charu C. Aggarwal, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/557,626

(22) Filed: Apr. 25, 2000

(51) Int. Cl.⁷ .............................................. G06F 17/30
(52) U.S. Cl. ...................................... 707/101; 707/103
(58) Field of Search ................................. 707/100, 101, 707/102, 103, 104.1, 200

(56) References Cited

PUBLICATIONS

C. Faloutsos et al., "FastMap: A Fast Algorithm for Indexing, Data–Mining and Visualization of Traditional and Multimedia Datasets," Proceedings of the ACM SIGMOD Conference, pp. 163–173, 1995.

K.V. Ravi Kanth et al., "Dimensionality Reduction for Similarity Searching in Dynamic Databases," Proceedings of the ACM SIGMOD Conference, pp. 166–176, 1998.

R. Agrawal et al., "An Interval Classifier for Database Mining Applications," Proceedings of the 18th VLDB Conference, Vancouver, British Columbia, Canada, pp. 1–14, 1992.

C. Apte et al., "RAMP: Rules Abstraction for Modeling and Prediction," IBM Research Report RC 20271, pp. 1–14, Jan. 1996.

J.R. Quinlan, "Induction of Trees," Machine Learning, Chapter 1, Kluwer Academic Publishers, Boston, pp. 81–105, 1986.

J. Shafer et al., "SPRINT: A Scalable Parallel Classifier for Data Mining," Proceedings of the 22nd VLDB Conference, Mumbai (Bombay), India, pp. 1–12, 1996.

M. Mehta et al., "SLIQ: A Fast Scalable Classifier for Data Mining," Proceedings of the Fifth International Conference on Extending Database Technology, Avignon, France, pp. 1–15, Mar. 1996.

M. Mehta et al., "MDL–based Decision Tree Pruning," IBM Almaden Research Center, San Jose, CA, pp. 1–6.

Kun–Lung Wu et al. (IEEE publication, Jun. 2001) discloses personalization with dynamic profiler (IBM Thomas J. Watson Res. Center, Yorktown, NY&) Advanced Issues of E–Commerce and Web–Based Information, pp. 12–2001).*

* cited by examiner

Primary Examiner—Diane D. Mizrahi
(74) Attorney, Agent, or Firm—Gail H. Zarick; Ryan, Mason & Lewis, LLP

(57) ABSTRACT

A technique of the system for generating a reduced representation of input data, wherein the input data has a first set of feature variables and a class variable associated therewith, comprises the following steps. A second set of feature variables is determined from the first set of feature variables, wherein the second set of feature variables corresponds to mutually orthogonal vectors. Then, one or more of the feature variables associated with the second set of feature variables are selected based on a level of discrimination with respect to the class variable. The input data is then represented using the one or more selected feature variables.

21 Claims, 4 Drawing Sheets

METHODS AND APPARATUS FOR PERFORMING DIMENSIONALITY REDUCTION IN A SUPERVISED APPLICATION DOMAIN

FIELD OF THE INVENTION

The present invention is related to data transformation and dimensionality reduction techniques associated with databases and, more particularly, to methods and apparatus for performing data transformation and dimensionality reduction in a supervised application domain in accordance with both a class variable and feature variables.

BACKGROUND OF THE INVENTION

In recent years, data mining applications have increased the development of techniques for processing high dimensional data, since most data mining problems are now posed in the context of very high dimensional data. Data sets which are inherently high dimensional may include, for example, demographic data sets in which the dimensions comprise information such as the name, age, salary, and other features which characterize a person. Typically, such problems have a large number of characteristics or features associated with them which are represented in a particular form. However, it is typically well known in the prior art that high dimensionality is a curse to many database applications and algorithms. This is because, in high dimensional space, traditional ways of defining similarity break down and cannot be effectively ascertained.

For this reason, it is always useful for database applications to be represented in a lower dimensional space using effective dimensionality reduction techniques. It is well known that database applications may be performed in either the "supervised" domain or the "unsupervised" domain. It is to be appreciated that supervised applications are those in which a special variable called the class variable exists, and the intent of the data mining application is to optimize various measures with respect to this special variable. For example, we may have a classification application in which the features variables comprise the different demographic attributes such as age, sex, salary, etc., and the class variable comprises people who have donated to charities in the past year. Then, this database may be used in order to model and determine the demographic behavior of regular donors. Such a software system may be used by a charitable organization to send mailers to all those people who are most likely to be donors. Such a problem is said to be a classification problem, and is considered "supervised" since it is focused around a special variable known as the class variable. On the other hand, there are many problems which are inherently "unsupervised." Examples include clustering problems in which the demographic data is divided into clusters of similar people. In such cases, the data mining technique is not centered around any special variable and the clusters are found based on the variables listed in the demographic database.

Dimensionality reduction methods are often used for unsupervised applications. Techniques that have been effectively used in order to perform dimensionality reduction in large classes of applications in the unsupervised domain include, for example, singular value decomposition and KL (Karhunen Loeve) transform, see, e.g., C. Faloutsos, K.-I. Lin, "FastMap: A Fast Algorithm for Indexing, Data-Mining and Visualization of Traditional and Multimedia Datasets," Proceedings of the ACM SIGMOD Conference, 1995; and K. V. Ravi Kanth, D. Agrawal, A. Singh, "Dimensionality Reduction for Similarity Searching in Dynamic Databases," Proceedings of the ACM SIGMOD Conference, 1998, the disclosures of which are incorporated by reference herein.

However, the existing techniques used in unsupervised problems for dimensionality reduction are not as effectively applicable to the supervised domain. This is because the dimensionality reduction in the unsupervised domain is focused only on the creation of a new set of feature variables which are mutually independent. In the supervised domain, however, dimensionality reduction has stronger implications since such applications include the use of the class variable for effective supervision. In supervised problems, which as mentioned above, use the set of feature variables and the class variable, the data is divided into two categories: the training data and the test data. The training data is used in order to develop the models which relate the feature variables to the class variable. For a given test example in which only the feature variables are known, it is desirable to find the class variable using the model which was constructed from the training data set. This problem is referred to as classification and has numerous applications in the literature including customer segmentation, target marketing and target mailing among others. Numerous techniques are known for building classification models in the prior art. These techniques include decision trees, DNF (Disjunctive Normal Form) rules, and neural networks, among others, see, e.g., Agrawal R., Ghosh S., Imielinski T., Iyer B., and Swami A., "An Interval Classifier for Database Mining Applications," Proceedings of the 18th VLDB Conference, Vancouver, British Columbia, Canada 1992; Apte C, Hong S. J., Lepre J., Prasad S., and Rosen B, "RAMP: Rules Abstraction for Modeling and Prediction," IBM Research Report RC 20271, June 1995; Quinlan J. R., "Induction of Decision Trees," Machine Learning, Volume 1, Number 1, 1986; Shafer J., Agrawal R., and Mehta M., "SPRINT: A Scaleable Parallel Classifier for Data Mining," Proceedings of the 22nd VLDB Conference, Bombay, India, 1996; Mehta M., Agrawal R., and Rissanen J., "SLIQ: A Fast Scaleable Classifier for Data Mining," Proceedings of the Fifth International Conference on Extending Database Technology, Avignon, France, March 1996, the disclosures of which are incorporated by reference herein. However, all of these techniques are susceptible to the representation of the data used. In general, it is desirable to have a small set of features in order to effectively represent the data. Typical classification models respond more effectively to such sets of features.

Unfortunately, effective techniques for performing dimensionality reduction in the supervised domain do not exist and, as mentioned above, the existing techniques used in unsupervised problems for dimensionality reduction are not as effectively applicable to the supervised domain.

SUMMARY OF THE INVENTION

The present invention provides methods and apparatus for performing effective data transformation and dimensionality reduction in the supervised domain in accordance with both the class variable and the feature variables (also referred to herein as "features"). As mentioned above, existing dimensionality reduction, such as, for example, singular value decomposition, are practiced in the unsupervised domain. However, advantageously, the present invention provides methodologies for performing data transformation and dimensionality reduction in the supervised domain. The invention achieves at least two primary goals in the feature creation process:

(1) There is often considerable interdependence among the different features. For example, in a typical application, a person's age may be highly correlated with salary. Therefore, it may be useful to devise cases in which there is mutual independence in terms of the feature variables. In accordance with the present invention, methodologies are provided for performing transformations, so that there is independence among the feature variables.

(2) Certain features are inherently more discriminatory than others. By evaluating transformations of features, it is possible to devise features which are both discriminatory and non-redundant. The present invention provides methodologies for developing such sets of features.

In general, the present invention performs the separate processes of finding mutually independent features and finding features which have a very high discriminatory power. In accordance with the invention, this is performed by first transforming the data into a space where the features are represented by a set of mutually orthogonal vectors, and then selecting a subset of these vectors in order to represent the data.

More specifically, the present invention employs a two-phase process. In the first phase, the data is transformed in a way so as to create fewer redundancies among the feature variables. In the second phase, those features which have greater discriminatory power with respect to the class variable are selected.

In order to perform the first phase of the process, the features are transformed in a way so that greater attention is paid to developing a set of features which are independent of one another. In order to do so, in an illustrative embodiment, a covariance matrix for the data sets is computed. Once the covariance matrix is computed, the eigenvectors for the matrix are evaluated, and the directions in which the features are uncorrelated are found. The directions are the new set of features which are used to represent the data.

Once the set of features is found in the first phase, the next phase is performed to find those combinations of features which have the greatest amount of discriminatory power. In order to do so, in an illustrative embodiment, the data is projected along each eigenvector and the ratio of the inter-class variance to the intra-class variance is found. The features with the largest ratio of inter-class variance to intra-class variance are the ones which have the largest discriminatory power. These features are then selected and used for representing the data in a more concise way. The concisely represented data is more likely to be useful for effective classification.

In order to represent the data in the new space of reduced features, each record, or grouping of input data, is represented as a vector in d-dimensional space, where d is the number of dimensions. Next, the projection of the records on the unit eigenvectors in the feature space is determined. These projections are used as the coordinates of the vectors in the new space.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The following description will illustrate the invention using an exemplary data processing system architecture. It should be understood, however, that the invention is not limited to use with any particular system architecture. The invention is instead more generally applicable to any data processing system in which it is desirable to perform data transformation, wherein there is independence among feature variables, and dimensionality reduction, wherein discriminatory and non-redundant features are selected to represent the data being processed.

Figure 1:
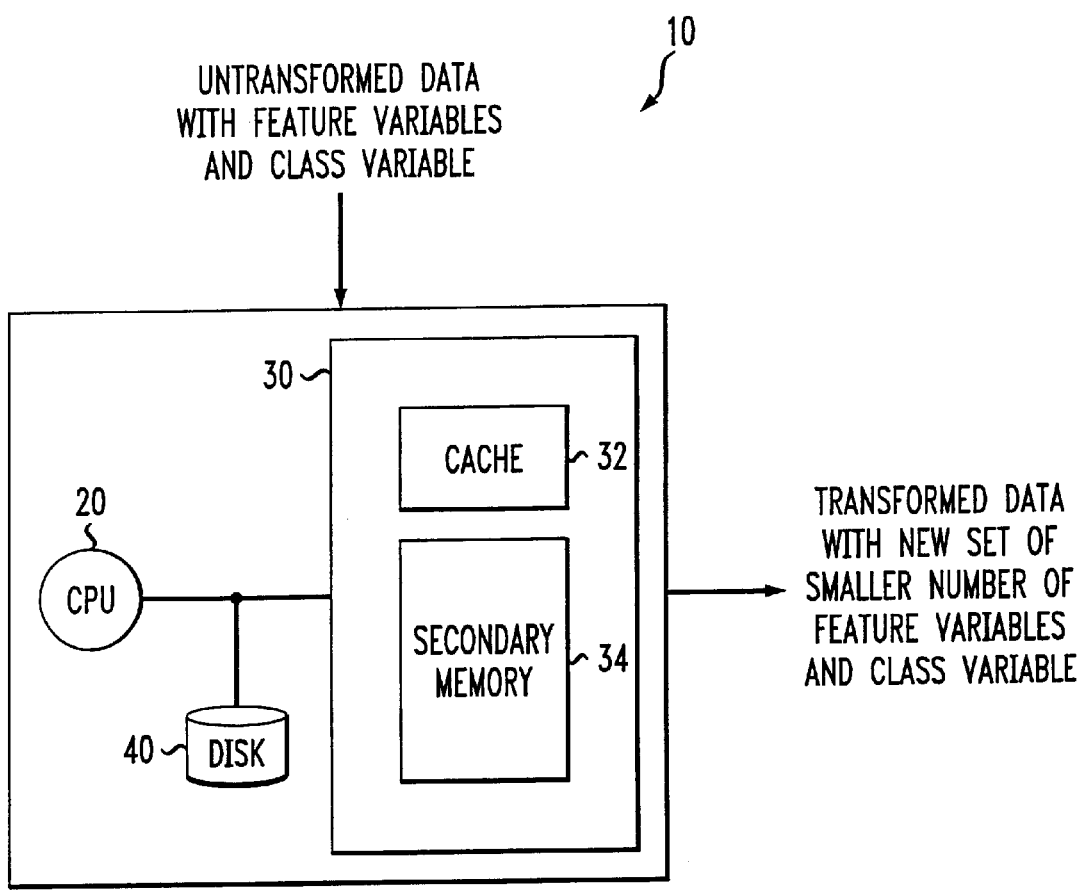
FIG. 1 is a block diagram illustrating a hardware implementation suitable for employing data transformation and dimensionality reduction methodologies according to an embodiment of the present invention.

Referring initially to FIG. 1, an exemplary architecture suitable for employing the present invention is shown. As illustrated, an exemplary system comprises a computer system 10. The computer system 10 may be a separate system used to process input data. The computer system 10 may alternatively be part of the server which is coupled to multiple client devices via a network (e.g., Internet, private network, a local area network, or some other suitable network), wherein the client devices communicate with the server in order to access a database resident on the server. In any case, the system 10 comprises a central processing unit (CPU) 20, a main memory 30 and a disk 40. The main memory 30 may comprise a cache 32 and a secondary memory 34. The data input to the computer system 10 includes untransformed data with feature variables and a class variable. This is stored on the disk 40. The calculations for performing the transformation and dimensionality reduction according to the invention are performed in the CPU 20 in association with the cache 32 and the secondary memory 34 of the main memory 30. The cache 32 is preferably present in the system in order to speed up calculations. The output of system 10 is the transformed data with a new set of features including a smaller number of feature variables and class variable. The transformed data may then be used, for example, in accordance with database queries. Advantageously, due to the reduction in dimensionality of the data, improved similarity searches may be performed in accordance with the data.

Accordingly, in this illustrative embodiment, the data transformation and dimensionality reduction operations of the present invention are executed in association with the computer system 10. All or a portion of the results generated in association with the computer system may be presented on a display (not shown) to a system user, if so desired. Further, in one embodiment, software components including program instructions or code for performing the methodologies of the invention, as described herein, may be stored in one or more memory devices described above and, when ready to be utilized, loaded in part or in whole and executed by the CPU.

Figure 2:
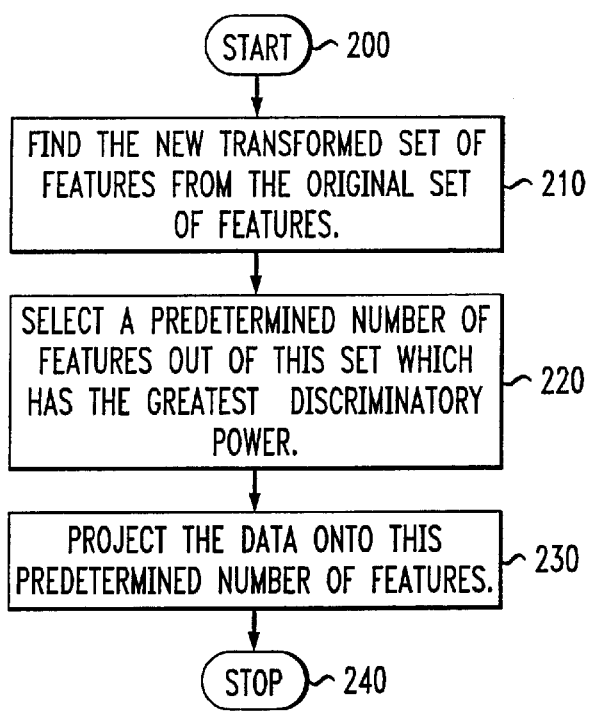
FIG. 2 is a flow diagram illustrating an overall process for data transformation and dimensionality reduction according to an embodiment of the present invention.

Referring now to FIG. 2, an overall process is shown for performing data transformation and dimensionality reduction according to an embodiment of the present invention. As shown, the overall process begins at block 200. In step 210, a transformation of the data which creates the least correlation among the different features is determined. That is, the new transformed set of features is generated from the originally input set of features. A more detailed description of this process is provided in accordance with FIG. 3. In step 220, a predetermined number of features is selected out of the set, generated in step 210, which has the greatest discriminatory power. A more detailed description of this process is provided in accordance with FIG. 4. In step 230, the data is projected onto the predetermined number of features selected in step 220. A more detailed description of this process is provided in accordance with FIG. 5. The overall process ends at block 240.

Figure 3:
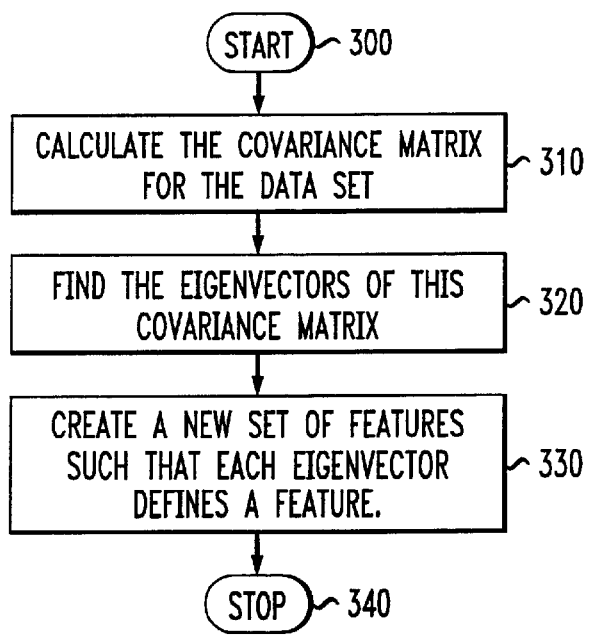
FIG. 3 is a flow diagram illustrating a procedure for generating a transformed feature according to an embodiment of the present invention.

Referring now to FIG. 3, a procedure is shown for generating an uncorrelated feature set according to an embodiment of the present invention. It is to be understood that this process corresponds to step 210 in FIG. 2. The process begins at block 300. In step 310, a covariance matrix for the given data set is calculated. The covariance matrix is defined to be a matrix which has a row-size and column-size which is equal to the number of dimensions in the data. The entry ij of this matrix is equal to the covariance between row i and column j. A detailed description of how the covariance matrix is calculated is provided in accordance with FIG. 6. In step 320, the eigenvectors of this covariance matrix are found. Methods of finding eigenvectors are well known in classical mathematics, e.g., D. Hoffmnan, R. Kunze, "Linear Algebra," Prentice Hall, 1971, the disclosure of which is incorporated by reference herein. In step 330, a new set of features is created out of these eigenvectors, such that each eigenvector defines a feature. The new set of features is used to represent the data. The process ends at block 340.

Figure 4:
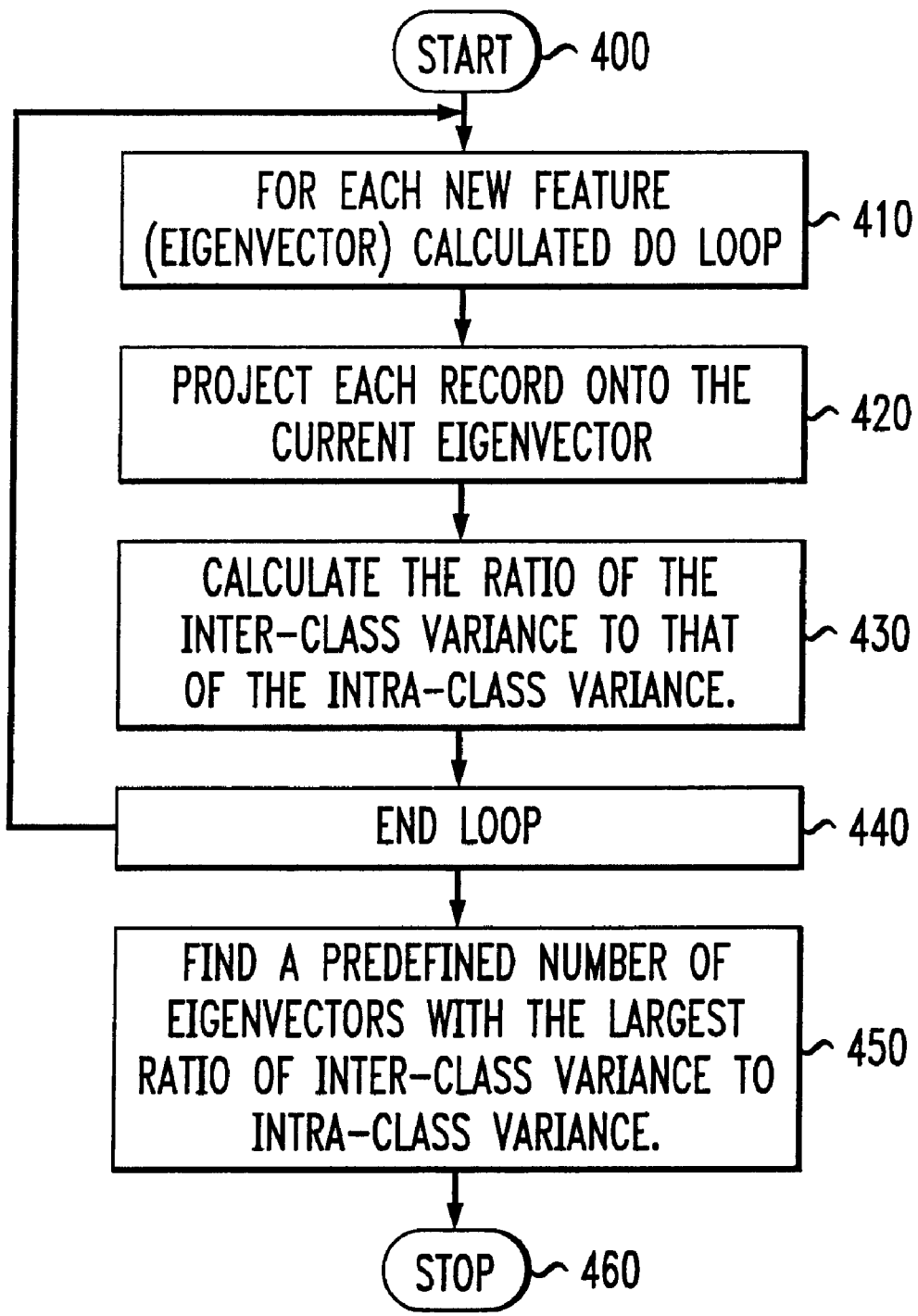
FIG. 4 is a flow diagram illustrating a procedure for selecting relevant transformed features according to an embodiment of the present invention.

Referring now to FIG. 4, a procedure is shown for selecting relevant transformed features according to an embodiment of the present invention. That is, the set of features which have the greatest level of discriminatory power is found. It is to be understood that this process corresponds to step 220 in FIG. 2. The process begins at block 400. In order to calculate the discriminatory power of each feature (eigenvector), a "DO LOOP" is implemented as shown in step 410. Steps 410 through 440 are encompassed by this DO LOOP. In step 420, each record is projected onto the current eigenvector. A record is a grouping of data associated with the input data. In step 430, the ratio of the inter-class variance to that of the intra-class variance is calculated. This process is done repeatedly for each eigenvector in the loop defined by steps 410 through 440. The loop ends at block 440. Finally, in step 450, a predefined number of eigenvectors are found which have the largest ratio of inter-class variance to intra-class variance. These vectors are the feature set which represent the input data. The process ends at block 460. Thus, the selection process is preferably performed to increase the level of separation between different classes in order to maximize the level of discrimination. It is to be appreciated that this selection process yields non-redundant features because it results in features in which the different classes are separated the most. For a classification problem, this is the driving force behind feature selection.

Figure 5:
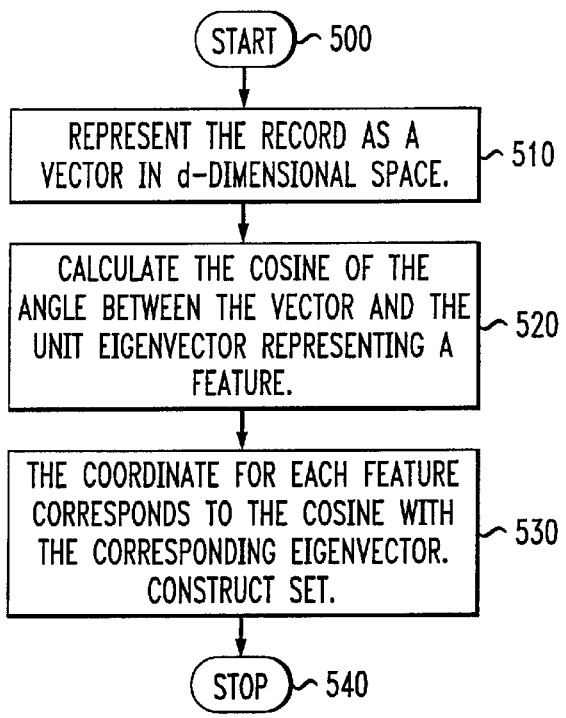
FIG. 5 is a flow diagram illustrating a procedure for transforming data to a new set of features according to an embodiment of the present invention.

Referring now to FIG. 5, a procedure is shown for transforming data to the new set of features according to an embodiment of the present invention. It is to be understood that this process corresponds to step 230 in FIG. 2. The process begins at block 500. In order to transform the data into the new set of features, each record is represented as a vector in d-dimensional space. This is accomplished in step 510. In step 520, a dot product is calculated between this vector representation and the eigenvector of the covariance matrix which represents a feature. That is, the cosine of the angle between the vector and the unit eigenvector representing the feature is calculated. Recall that this set of eigenvectors was found by the procedure illustrated in FIG. 3. The coordinate for each feature corresponds to this value, i.e., the cosine with the corresponding eigenvector. In step 530, the final set of coordinates for each record is constructed using these new features. The process ends at block 540.

Figure 6:
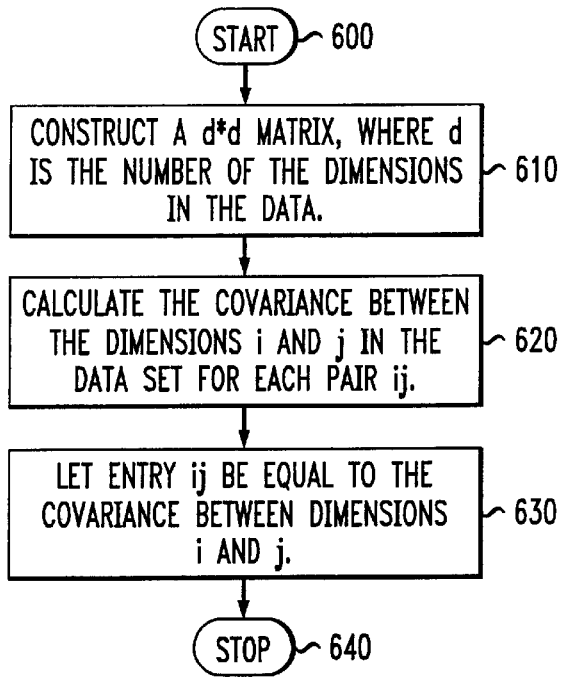
FIG. 6 is a flow diagram illustrating a procedure for calculating a covariance matrix for a given data set according to an embodiment of the present invention.

Referring now to FIG. 6, a procedure is shown for calculating a covariance matrix for a given data set according to an embodiment of the present invention. It is to be understood that this process corresponds to step 310 in FIG. 3. The process begins at block 600. In step 610, a d*d matrix is constructed, where d is the number of dimensions in the data. In step 620, the covariance between dimensions i and j in the data set for each pair ij is calculated. The covariance between dimensions i and j is computed by picking out the two sets of numbers corresponding to the dimensions i and j. In step 630, the entry ij of the matrix is set to the covariance between the dimensions i and j. This process is repeated for each entry until the entire matrix has been computed. The process ends at block 640.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of generating a reduced representation of input data, the input data having a first set of feature variables and a class variable associated therewith, the method comprising the steps of:

determining a second set of feature variables from the first set of feature variables, wherein the second set of feature variables corresponds to mutually orthogonal vectors;

selecting one or more feature variables associated with the second set of feature variables based on a level of discrimination with respect to the class variable; and representing the input data using the one or more selected feature variables.

2. The method of claim 1, wherein the determining step further comprises the steps of:

computing a covariance matrix from the first set of feature variables;

determining eigenvectors associated with the covariance matrix; and constructing the second set of feature variables, wherein each feature variable corresponds to an eigenvector.

3. The method of claim 1, wherein the level of discrimination for each feature variable is calculated by projecting the input data on the corresponding eigenvectors.

4. The method of claim 1, wherein a ratio of inter-class variance to intra-class variance is used to select the second set of feature variables.

5. The method of claim 1, wherein the vectors with the highest discrimination power are selected to represent the input data.

6. The method of claim 1, wherein the representing step further comprises projecting the input data onto the one or more selected feature variables.

7. The method of claim 1, wherein the selection step is performed to increase the level of separation between different classes in order to maximize the level of discrimination.

8. Apparatus for generating a reduced representation of input data, the input data having a first set of feature variables and a class variable associated therewith, the apparatus comprising:

at least one processor operative to: (i) determine a second set of feature variables from the first set of feature variables, wherein the second set of feature variables corresponds to mutually orthogonal vectors; (ii) select one or more feature variables associated with the second set of feature variables based on a level of discrimination with respect to the class variable; and (iii) represent the input data using the one or more selected feature variables; and a memory, coupled to the at least one processor, which stores at least one of the input data, the feature variables, and the reduced input data representation.

9. The apparatus of claim 8, wherein the determining operation further comprises:

(a) computing a covariance matrix from the first set of feature variables; (b) determining eigenvectors associated with the covariance matrix; and (c) constructing the second set of feature variables, wherein each feature variable corresponds to an eigenvector.

10. The apparatus of claim 8, wherein the level of discrimination for each feature variable is calculated by projecting the input data on the corresponding eigenvectors.

11. The apparatus of claim 8, wherein a ratio of inter-class variance to intra-class variance is used to select the second set of feature variables.

12. The apparatus of claim 8, wherein the vectors with the highest discrimination power are selected to represent the input data.

13. The apparatus of claim 8, wherein the representing operation further comprises projecting the input data onto the one or more selected feature variables.

14. The apparatus of claim 8, wherein the selection operation is performed to increase the level of separation between different classes in order to maximize the level of discrimination.

15. An article of manufacture for generating a reduced representation of input data, the input data having a first set of feature variables and a class variable associated therewith, comprising a machine readable medium containing one or more programs which when executed implement the steps of:

determining a second set of feature variables from the first set of feature variables, wherein the second set of feature variables corresponds to mutually orthogonal vectors;

selecting one or more feature variables associated with the second set of feature variables based on a level of discrimination with respect to the class variable; and representing the input data using the one or more selected feature variables.

16. The article of claim 15, wherein the determining step further comprises the steps of:

computing a covariance matrix from the first set of feature variables;

determining eigenvectors associated with the covariance matrix; and constructing the second set of feature variables, wherein each feature variable corresponds to an eigenvector.

17. The article of claim 15, wherein the level of discrimination for each feature variable is calculated by projecting the input data on the corresponding eigenvectors.

18. The article of claim 15, wherein a ratio of inter-class variance to intra-class variance is used to select the second set of feature variables.

19. The article of claim 15, wherein the vectors with the highest discrimination power are selected to represent the input data.

20. The article of claim 15, wherein the representing step further comprises projecting the input data onto the one or more selected feature variables.

21. The article of claim 15, wherein the selection step is performed to increase the level of separation between different classes in order to maximize the level of discrimination.

* * * * *